United States Patent
Alfano et al.

(10) Patent No.: US 10,493,909 B1
(45) Date of Patent: Dec. 3, 2019

(54) VEHICLE COMMUNICATION SYSTEMS AND METHODS OF OPERATING VEHICLE COMMUNICATION SYSTEMS

(71) Applicants: BlackBerry Limited, Waterloo (CA); 2236008 Ontario Inc., Waterloo (CA)

(72) Inventors: Nicholas Patrick Alfano, Burnaby (CA); Rodney Dwight Rempel, Burnaby (CA)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 15/985,768

(22) Filed: May 22, 2018

(51) Int. Cl.
| H04R 3/00 | (2006.01) |
| B60Q 5/00 | (2006.01) |
| B60K 35/00 | (2006.01) |
| H04W 4/90 | (2018.01) |
| H04R 1/32 | (2006.01) |
| H04W 4/40 | (2018.01) |

(52) U.S. Cl.
CPC ............ B60Q 5/005 (2013.01); B60K 35/00 (2013.01); H04R 1/323 (2013.01); H04R 1/326 (2013.01); H04W 4/40 (2018.02); H04W 4/90 (2018.02); *B60K 2370/148* (2019.05); *H04R 2499/13* (2013.01)

(58) Field of Classification Search
CPC ......... B60R 11/0217; B60R 2001/1284; B60R 2001/1276; B60R 2011/004; B60R 16/0373; B60S 1/0885; H04M 2250/74; G10K 2210/1282

USPC .................................................... 381/86, 122
See application file for complete search history.

(56) References Cited

U.S. PATENT DOCUMENTS

| 5,917,920 | A | 6/1999 | Humphries |
| 8,457,283 | B2 | 6/2013 | Stahlin et al. |
| 2008/0273715 | A1 | 11/2008 | Snider et al. |
| 2009/0110212 | A1* | 4/2009 | Iwasaki .................... H04M 3/56 381/92 |
| 2010/0141467 | A1 | 10/2010 | Kirkpatrick |
| 2011/0313594 | A1* | 12/2011 | Kato ...................... G07C 5/008 701/2 |

(Continued)

FOREIGN PATENT DOCUMENTS

| EP | 2127964 A2 | 12/2009 |
| WO | 2018089855 A1 | 5/2018 |

*Primary Examiner* — George C Monikang
(74) *Attorney, Agent, or Firm* — Rowand LLP

(57) ABSTRACT

Vehicle communication systems and methods of operating the same. The vehicle communication system includes one or more microphones and one or more loudspeakers positioned about a vehicle. The system includes processor executable instructions for determining that the vehicle is operating in an emergency mode and, in response, activating a first microphone and a first loudspeaker for enabling communication between a first acoustic zone within the vehicle and a second acoustic zone exterior to the vehicle. The system may detect, from one of the first acoustic zone and the second acoustic zone, a first acoustic input and generate a second signal from the detected first acoustic input. The system may transmit the second signal to the first loudspeaker for producing sound waves that are audible in the other of the first acoustic zone and the second acoustic zone.

13 Claims, 9 Drawing Sheets

(56) References Cited

U.S. PATENT DOCUMENTS

| | | | |
|---|---|---|---|
| 2012/0313796 A1* | 12/2012 | Lee | B60R 25/2018 340/989 |
| 2013/0136196 A1* | 5/2013 | Rousu | H04B 1/3822 375/259 |
| 2014/0368601 A1* | 12/2014 | deCharms | H04W 4/021 348/14.02 |
| 2015/0222977 A1* | 8/2015 | Angel, Jr. | H04R 1/105 381/74 |
| 2017/0021768 A1 | 1/2017 | Jaegal et al. | |
| 2018/0105103 A1 | 4/2018 | O | |

* cited by examiner

US 10,493,909 B1

VEHICLE COMMUNICATION SYSTEMS AND METHODS OF OPERATING VEHICLE COMMUNICATION SYSTEMS

FIELD

The present application generally relates to communication systems and, in particular, vehicle communication systems and methods for operating vehicle communication systems.

BACKGROUND

Vehicles commonly include one or more loudspeakers for providing acoustic output, such as music, talk radio, or the like. Vehicles can also be configured to include one or more microphones for detecting acoustic input, such as voice commands or the like. In addition to operating loudspeakers or microphones for discrete or individual operations, some vehicles can configure a combination of one or more loudspeakers or one or more microphones for enhancing the aural experience of vehicle occupants. For example, some vehicles are configured to detect objectionable noise from the vehicle exterior and, in response, enhance acoustic output within the vehicle to the exclusion of external objectionable noise. While vehicles commonly focus on the aural experience within the vehicle cabin, it may be desirable in some scenarios to consider the aural experience at acoustic zones external to the vehicle, at a remote location to the vehicle, and/or at particular locations or zones within the vehicle.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
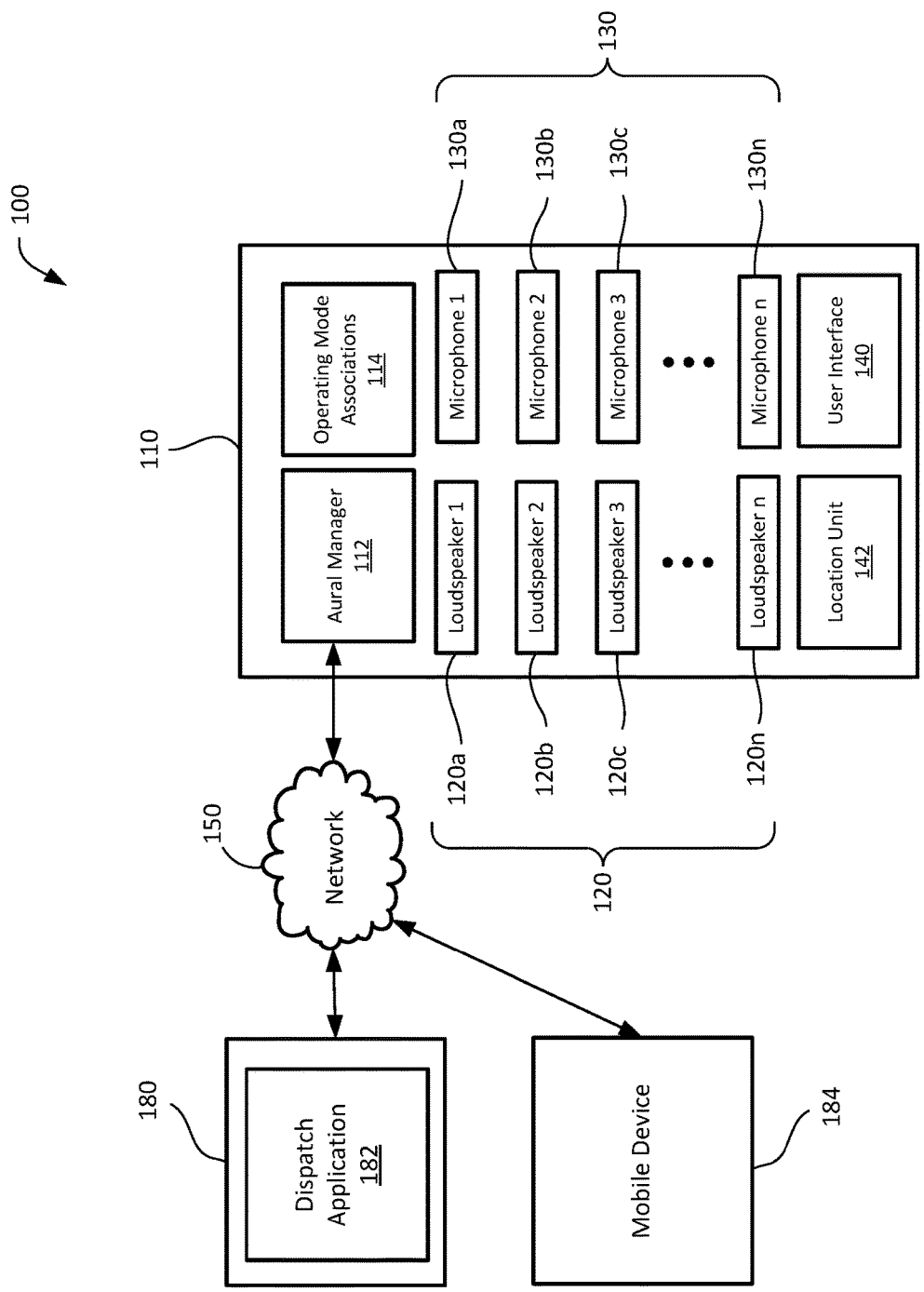
FIG. 1 illustrates, in block diagram form, a system for managing vehicle communications, in accordance with an example of the present application.

In a first aspect, the present application describes a computer-implemented method of operating a communication system in a vehicle. The communication system may include one or more microphones and one or more loudspeakers. The method includes: determining that the vehicle is operating in an emergency mode and, in response, activating a first microphone and a first loudspeaker for enabling communication between a first acoustic zone within the vehicle and a second acoustic zone exterior to the vehicle; detecting, from one of the first acoustic zone and the second acoustic zone, a first acoustic input using the first microphone; generating a second signal from the detected first acoustic input; and transmitting the second signal to the first loudspeaker for producing sound waves that are audible the other of the first acoustic zone and the second acoustic zone.

In another aspect, the present application describes a communication system in a vehicle. The communication system includes a processor, a memory coupled to the processor; a first loudspeaker and a first microphone coupled to the processor, and an aural manager including processor executable instructions. The processor executable instructions may be stored in memory and, when executed, may cause the processor to: determine that the vehicle is operating in an emergency mode and, in response, activating the first microphone and the first loudspeaker for enabling communication between a first acoustic zone within the vehicle and a second acoustic zone exterior to the vehicle; detect, from one of the first acoustic zone and the second acoustic zone, a first acoustic input using the first microphone; generate a second signal from the detected first acoustic input; and transmit the second signal to the first loudspeaker for producing sound waves that are audible the other of the first acoustic zone and the second acoustic zone.

In yet a further aspect, the present application describes non-transitory computer-readable storage medium storing processor-readable instructions that, when executed, configure a processor to perform one or more of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Vehicle communication systems commonly focus on enhancing the aural experience of vehicle occupants within a vehicle. That is, vehicle communication systems are often configured to focus on the integrity or fidelity of acoustic output within the vehicle cabin. However, in the unfortunate event that the vehicle is involved in a collision or other emergency scenario, vehicle doors may become obstructed or vehicle windows may be closed. A civilian bystander who first attends to the vehicle (e.g., prior to emergency first responder professionals arriving at the vehicle) may not be able to remove the door obstruction or smash a vehicle window. Thus, even if the occupants are conscious and able to respond to the bystander, the bystander may have difficulty communicating with the vehicle occupants. Thus, it may be desirable to provide for improved vehicle communication systems and methods of operating the vehicle communication systems that provide for enabling communication between a first acoustic zone within the vehicle and a second acoustic zone exterior to the vehicle.

Reference is made to FIG. 1, which illustrates, in block diagram form, a system 100 for managing vehicle communications, in accordance with an example of the present application. The system 100 includes a vehicle communication system 110 that is installed within a vehicle and includes a remote device 180.

In examples described herein, vehicles are motor vehicles (e.g., automobiles, cars, trucks, buses, motorcycles, etc.), aircrafts (e.g., airplanes, unmanned aerial vehicles, unmanned aircraft systems, drones, helicopters, etc.), spacecrafts (e.g., spaceplanes, space shuttles, space capsules, space stations, satellites, etc.), watercraft (e.g., ships, boats, hovercraft, submarines, etc.), railed vehicles (e.g., trains, trams, etc.), or other types of vehicles including any combinations of the foregoing.

The remote device 180 is a computing device having one or more processors, memory, and communication capabilities. In examples described herein, the remote device 180 is an electronic device. Electronic devices can be endpoints including one or more of any of the following: mobile devices (e.g., smartphones, tablets, phablets, laptops, wearables, gaming devices, navigation devices, etc.), computers (e.g., laptops, desktops, all-in-one computers, thin-client devices, etc.), IoT (Internet of Things) devices (e.g., vehicles, appliances, smart devices, connected devices, etc.), EoT (Enterprise of Things) devices (i.e., IoT devices in an enterprise), or any similar computing device or combination thereof.

In some examples, the remote device 180 is a computing device at a Public Safety Answering Point, such as an emergency call center for receiving calls requesting emergency assistance. The remote device 180 may be operated to dispatch emergency response professionals to a location of the emergency event. In North America, an example of the Public Safety Answering Point is a 9-1-1 dispatch center or a third-party vehicle monitoring service dispatch center (e.g., OnStar™ monitoring service dispatch center).

The remote device 180 includes a dispatch application 182. The dispatch application 182 includes processor-executable instructions for communicating, via a network 150, with the vehicle communication system 110. In some examples, the dispatch application 182 receives signals from the vehicle communication system 110 for monitoring a geographical location or an operational status of the vehicle. In some examples, the dispatch application 182 includes processor-executable instructions configured to provide a user interface enabling two-way voice communications between the remote device 180 and the vehicle communication system 110.

In some scenarios, the system 110 can include one or more other remote devices. Other remote devices can include a mobile device 184 associated with a bystander external to a vehicle. For example, when a bystander approaches a vehicle, the vehicle communication system 110 can detect the mobile device 184 via short-range communication protocols (e.g., Bluetooth™ discover mode) and initiate a communication channel with the mobile device 184 via a short range-communication protocol channel or through the network 150. In FIG. 1, the mobile device 184 is illustrated as forming a communication link via the network 150; however, in some examples, the mobile device 184 initiates a local short-range communication link with the vehicle communication system 110 directly (not illustrated). As will be described in an example herein, the vehicle communication system 110 can be configured to detect the mobile device 184 proximal to a vehicle and initiate a communication channel with the mobile device 184 for facilitating communication between a first acoustic zone and a second acoustic zone of the vehicle.

The vehicle communication system 110 may be a single computing device, multiple computing devices, or other arrangement of computing devices for executing example operations described herein. The vehicle communication system 110 includes one or more processors and memory.

The vehicle communication system 110 includes a communication subsystem for wireless data communication and the communication subsystem allows data to be transmitted to or received from other devices via a network 150. For example, the vehicle communication system 110 communicates over the network 150 with remote devices, such as a remote device 180 or the mobile device 184. The network 150 may include a plurality of interconnected wired and wireless networks, including the Internet, wireless local area networks, wireless area networks, cellular networks, or the like. In some other examples, the communication subsystem includes a Bluetooth™ subsystem or other short-range communication subsystems for establishing communication channels with remote devices that are detected within proximity of the vehicle having the vehicle communication system 110.

The vehicle communication system 110 includes one or more loudspeakers 120 (illustrated individually as 120a, 120b, 120c, . . . 120n). The loudspeakers 120 may be electroacoustic transducer devices configured to convert electrical signals into sound waves or acoustic output. The vehicle communication system 110 includes one or more microphones 130 (illustrated individually as 130a, 130b, 130c, . . . 130n). The microphones 130 may be transducers configured to detect sound waves or acoustic input and to convert the detected sound waves into electrical signals.

The vehicle communication system 110 may include an aural manager 112. The aural manager 112 includes processor-executable instructions to configure the loudspeakers 120 and the microphones 130 for one or more aural input and output functions described herein. For example, the aural manager 112 may configure the loudspeakers 120 and the microphones 130 for hands-free communication operations, active noise control operations, in-car communication operations, or other operations, described herein. In some examples, respective loudspeaker and/or microphone configurations may be associated with one or more vehicle operating modes. Example vehicle operating modes include a normal vehicle operation mode, an emergency vehicle operation mode, a vehicle service operation mode, or any other operating modes. Associations between vehicle operating modes and loudspeaker and/or microphone configurations may be stored in the operating mode associations 114.

The vehicle communication system 110 may include a user interface 140 configured to accept input from a vehicle occupant or to provide audible or visual output to the vehicle occupant relating to operations of the aural manager 112. The vehicle communication system 110 may include a location unit 142 configured, for example, to ascertain real-time or near-real time geographical location details of the vehicle.

In some scenarios, the vehicle communication system 110 configures the loudspeakers 120 and the microphones 130 for hands-free communication. For example, when the vehicle occupant associated with a mobile telephonic device (e.g., cellular telephone) is proximal the vehicle, a wireless communication channel, such as a Bluetooth™ communication link, may be formed between the mobile telephonic device and the vehicle communication system 110. The vehicle communication system 110 may configure the one or more loudspeakers 120 and one or more microphones 130 to operate as an extension of the microphone and loudspeaker of the mobile telephonic device, allowing the vehicle operator to conduct voice communications using the loudspeakers 120 and the microphones 130 and without handling the mobile telephonic device. Such configuration of the loudspeakers 120 and the microphones 130 for hands-free communication relieves the driver of the vehicle from needing to handle the mobile telephonic device.

In some scenarios, the vehicle communication system 110 configures the loudspeakers 120 and the microphones 130 for active noise control or noise cancellation operations. For example, the vehicle communication system 110 can be configured to detect, using one or more microphones 130, potentially objectionable sound waves including engine vibration noise or resonant waves. In response, the vehicle communication system 110 is configured to emit, using one or more loudspeakers 120, opposing sound waves for effectively cancelling out the potentially objectionable sound waves. In some examples, the opposing sound waves can have the same amplitude as the engine vibration noise or resonant waves but may be phase shifted. Such configuration of the loudspeakers 120 and the microphones 130 enhance the aural experience of one or more occupants of the vehicle by minimizing acoustics originating from outside the vehicle occupant cabin.

In some scenarios, the vehicle communication system 110 configures the loudspeakers 120 and the microphones 130 for enhancing in-vehicle communications among two or more vehicle occupants. Multiple microphones 130 are positioned about the vehicle such that respective microphones detect audible speech from each of the vehicle occupants and detect potentially objectionable noise. The vehicle communication system 110 may be configured to enhance audible speech from each of the vehicle occupants, dampen potentially objectionable noise from the engine or from an environment external to the vehicle, and provide audible speech output from each vehicle occupant to the other vehicle occupants on one or more loudspeakers 120 positioned proximal to the other vehicle occupants. When the vehicle communication system 110 is configured for enhancing in-vehicle communications, vehicle occupants in a front portion of the vehicle need not raise their voices when communicating with vehicle occupants in a rear portion of the vehicle. Such configuration of the loudspeakers 120 and the microphones 130 also enhances the aural experience of vehicle occupants, including excluding acoustics originating from outside the vehicle occupant cabin.

In the foregoing example configurations of the loudspeakers 120 and the microphones 130, the vehicle communication system 110 is configured to detect acoustic input emanating from an area external to the vehicle and counteract such acoustics for enhancing the aural experience within the vehicle. By counteracting acoustic input emanating from the vehicle exterior, the vehicle communication system 110 amplifies or increases clarity of communication conducted within the vehicle. The foregoing examples effectively compartmentalizes an acoustic zone within the vehicle from an acoustic zone exterior to the vehicle. However, in some scenarios, it may be desirable to combine: (a) acoustic input from the acoustic zone within the vehicle; and (b) acoustic input from the acoustic zone exterior to the vehicle for enabling communication among disparately located parties.

Figure 2A:
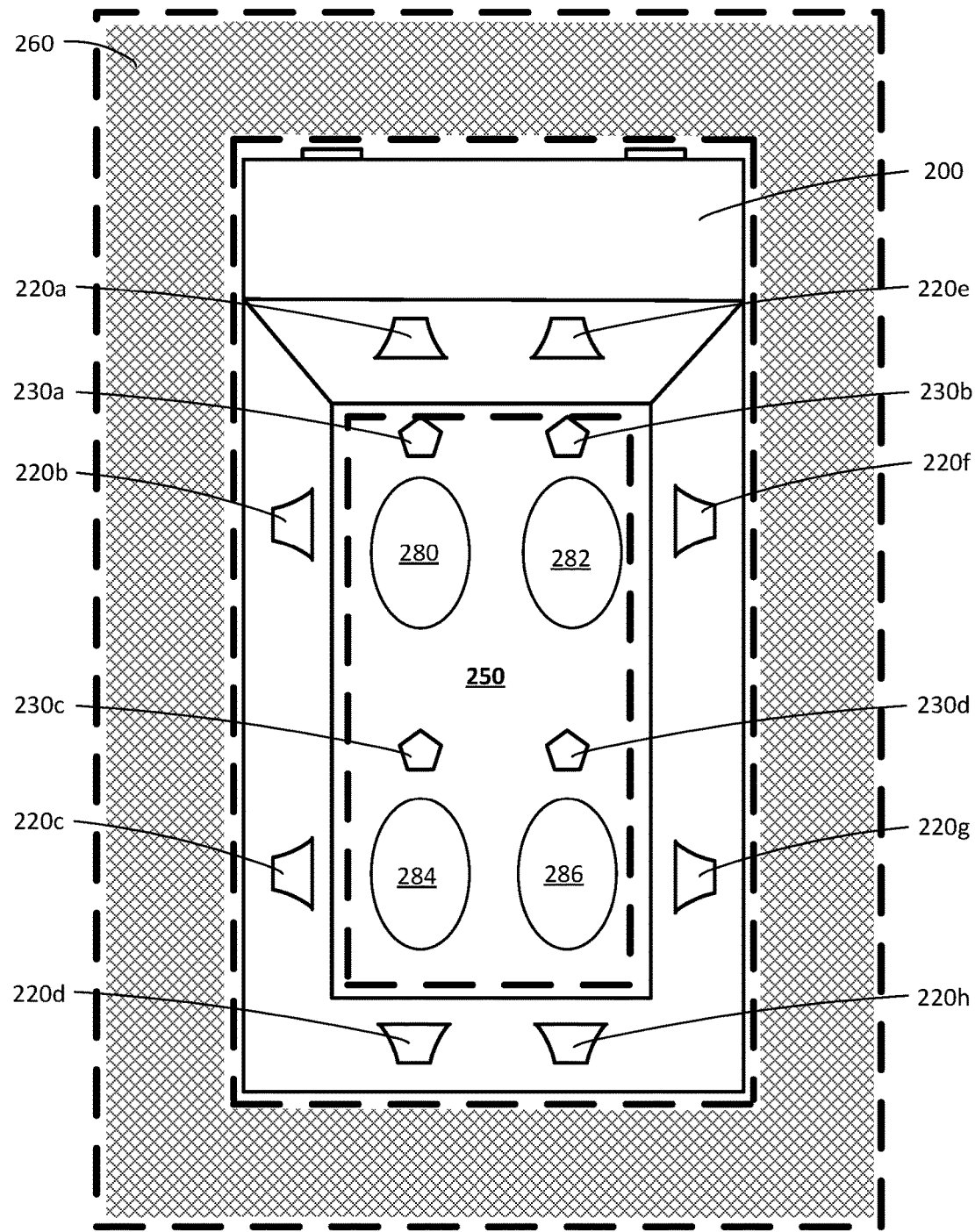
FIGS. 2A and 2B illustrate overhead, cross-sectional views of a vehicle having the vehicle communication system of FIG. 1 installed therein.
Figure 2B:
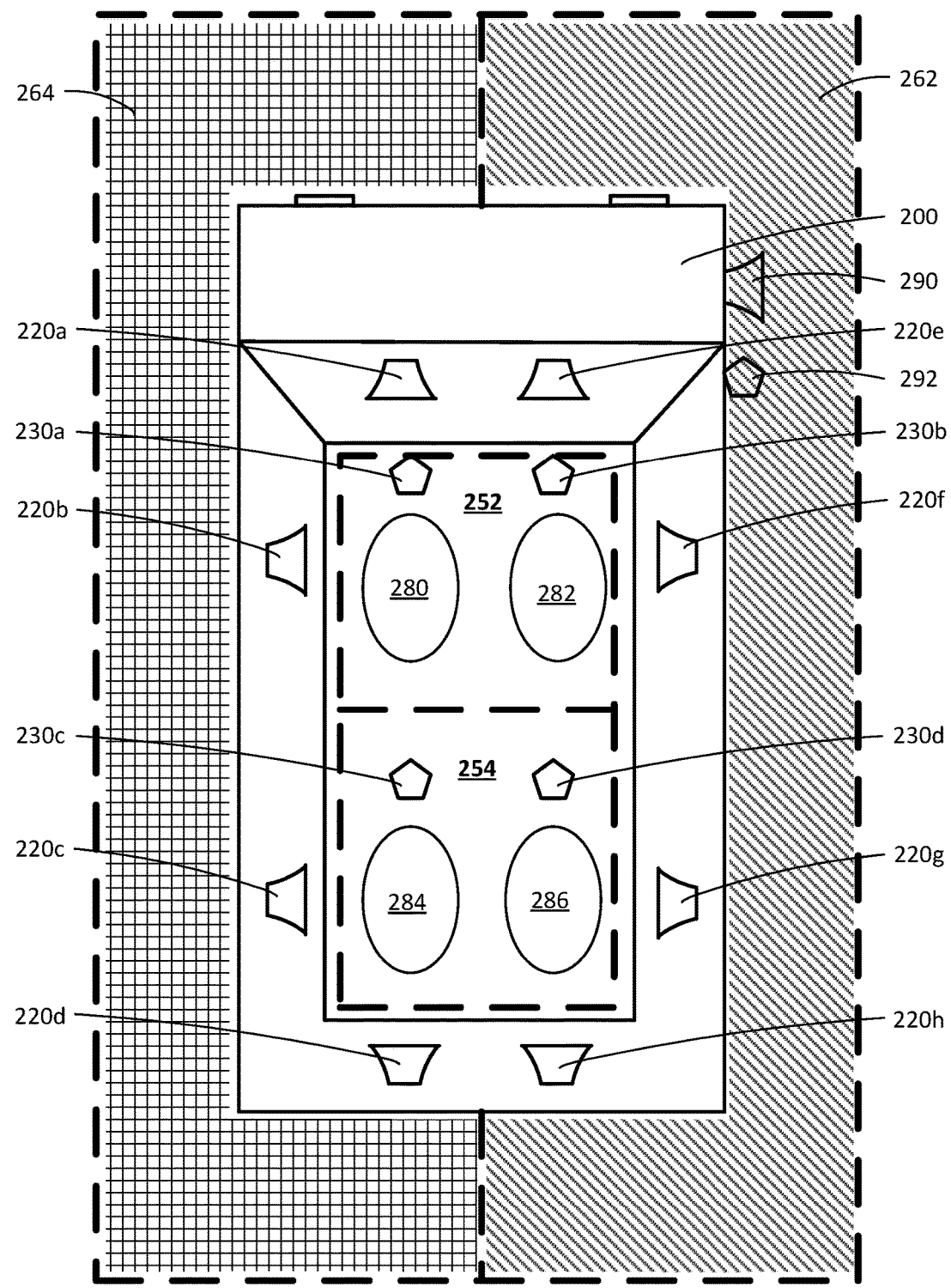

Reference is made to FIGS. 2A and 2B, which illustrates overhead, cross-sectional views of a vehicle 200 having the vehicle communication system 110 of FIG. 1 installed therein, in accordance with an example of the present application.

Referring first to FIG. 2A, a plurality of loudspeakers are installed about the vehicle. The loudspeakers are illustrated as a first loudspeaker 220a, a second loudspeaker 220b, a third loudspeaker 220c, a fourth loudspeaker 220d, a fifth loudspeaker 220e, a sixth loudspeaker 220f, a seventh loudspeaker 220g, and an eighth loudspeaker 220h. Eight discrete loudspeakers are illustrated in FIG. 2A; however, any number of loudspeakers may be included in the vehicle. The loudspeakers are installed at positions about a perimeter of a first acoustic zone 250. In some other examples, the loudspeakers can be installed at locations inward of the perimeter of the first acoustic zone 250. In FIG. 2A, the first acoustic zone 250 includes the vehicle interior.

A plurality of microphones are installed at staggered positions about the first acoustic zone 250. For example, the microphones are illustrated as a first microphone 230a, a second microphone 230b, a third microphone 230c, and a fourth microphone 230d. For example, the first microphone 230a and the second microphone 230b are positioned in a front portion of the vehicle 200 directed to detecting audible speech from a driver 280 or a front passenger 282, respectively, of the vehicle 200. The third microphone 230c and the fourth microphone 230d are positioned in a rear portion of the vehicle 200 directed to detecting audible speech from a third passenger 284 or a fourth passenger 286, respectively. FIG. 2A illustrates four example microphones; however, any number of microphones 230 positioned about the vehicle may be contemplated.

The vehicle 200 in FIG. 2A is illustrated to include the first acoustic zone 250 associated with a vehicle occupant cabin and a second acoustic zone 260 associated with a perimeter space exterior to the vehicle occupant cabin. The second acoustic zone 260 is illustrated with a hatching pattern and, in some examples, can include a larger area extending from the perimeter of the vehicle 200. In some other examples, it may be desirable to configure the vehicle communication system 110 with reference to a plurality of acoustic zones both within the vehicle occupant cabin and exterior to the vehicle occupant cabin for greater configuration granularity.

Reference is made to FIG. 2B, which illustrates the vehicle 200 having the vehicle communication system 110 of FIG. 1 installed therein. Contrasting with FIG. 2A, in FIG. 2B, the vehicle 200 is configured to include a first inner acoustic zone 252 and a second inner acoustic zone 254. The first inner acoustic zone 252 includes a volume of space for the driver 280 and the front passenger 282 of the vehicle 200. The first microphone 230a and the second microphone 230b may be directed to detection of audible speech substantially from the driver 280 or the front passenger 282, respectively.

The second inner acoustic zone 254 includes a volume of space for the third passenger 284 or the fourth passenger 286. The third microphone 230c and the fourth microphone 230d may be directed to detection of audible speech substantially from the third passenger 284 or the fourth passenger 286, respectively.

In some examples, the vehicle communication system 110 can be configured to provide a first set of signals to a first subset of loudspeakers (such as the first loudspeaker 220a, the second loudspeaker 220b, the fifth loudspeaker 220e, and the sixth loudspeaker 220f) proximal to the first inner acoustic zone 252 (e.g., loudspeakers illustrated in the top half of FIG. 2B). The loudspeakers positioned proximal to the first inner acoustic zone 252 may be configured to provide acoustic output that may be different than acoustic output provided to a second subset of loudspeakers (such as the third loudspeaker 220c, the fourth loudspeaker 220d, the seventh loudspeaker 220g, and the eight loudspeaker 220h) proximal to the second inner acoustic zone 254. The foregoing configuration of respective loudspeakers enhances intra-vehicle aural experience as targeted acoustic output is provided to respective vehicle occupants.

The vehicle 200 may also be configured to include a first external acoustic zone 262 and a second external acoustic zone 264. The first external acoustic zone 262 and the second external acoustic zone 264 is illustrated with different hatch patterns. The vehicle communication system 110 may be configured to provide signals to particular loudspeakers proximal to particular external acoustic zones for providing targeted aural output. For example, the vehicle communication system 110 may be configured to provide signals to one or more of the fifth loudspeaker 220e, the sixth loudspeaker 220f, the seventh loudspeaker 220g, or the eighth loudspeaker 220h that are adjacent the first external acoustic zone 262 when aural output is desirable for that acoustic zone. The vehicle communication system 110 may be configured to provide signals to one or more of the first loudspeaker 220a, the second loudspeaker 220b, the third loudspeaker 220c, or the fourth loudspeaker 220d adjacent the second external acoustic zone 264 when aural output is desirable for that region. In some examples, the vehicle communication system 110 is configured to provide independent acoustic output to each of the loudspeakers proximal to the first external acoustic zone 262 and the second external acoustic zone 264.

The loudspeakers can be positioned and oriented to generally face one or more of the interior acoustic zones. When aural output is desirable for one of the exterior acoustic zones, in some examples, the vehicle communication system 110 can be configured to amplify signals or otherwise process signals such that signals transmitted to targeted loudspeakers may be audible in the targeted exterior acoustic zone.

In some examples, the vehicle 200 includes an externally positioned loudspeaker 290. The externally positioned loudspeaker 290 is configured for emitting sound waves for alerting pedestrians to the presence of the vehicle 200. For example, in the scenario that the vehicle 200 may be an electric vehicle, the vehicle 200 may be relatively quieter as compared to a gas combustion automobile. Thus, the vehicle 200 may configure the externally positioned loudspeaker 290 to emit sound waves to imitate those of a gas combustion automobile. Other uses of the externally positioned loudspeaker 290 may also be contemplated.

In some examples, the vehicle 200 includes an externally positioned microphone 292. The externally positioned microphone 292 may be configured for detecting sound waves for capturing acoustic input from the physical area proximal to the externally positioned loudspeaker 290.

As will be described herein, in some examples, the externally positioned loudspeaker 290 is configured to provide acoustic output to the first external acoustic zone 262. Although, in FIG. 2B, the externally positioned loudspeaker 290 is positioned proximal to the first external acoustic zone 262, other externally positioned loudspeakers may be positioned at any other portion of the vehicle exterior for providing directed acoustic output to one or more targeted acoustic zones. With an externally positioned loudspeaker, a vehicle occupant may operate the vehicle communication system for communicating with a party external to the vehicle without opening a vehicle door or retracting a vehicle window. In some scenarios, it is desirable to limit operation of the externally positioned loudspeaker to particular scenarios, such as: (1) providing acoustic output for imitating a gas combustion vehicle; or (2) enabling communication between the vehicle occupant and a party external to the vehicle in response to explicit enablement by the vehicle occupant. That is, vehicle occupants may be selective when conveying acoustic input from the vehicle interior to the vehicle exterior (e.g., preventing confidential communications within the vehicle from being broadcast to the vehicle exterior).

In some other scenarios, the vehicle 200 may be involved in a collision or may have veered off a road. For example, when the vehicle 200 collides with one or more other vehicles or when the vehicle 200 rolls off the road and may have flipped over, the vehicle doors may be wedged in the closed position, it may be desirable for the vehicle occupant to be able to communicate, for example, with a bystander exterior to the vehicle without yelling or raising one's voice. The vehicle occupant could be injured or unconscious and unable to explicitly enable the vehicle communication system for conveying communication between the vehicle interior and the vehicle exterior.

In some other scenarios, the vehicle 200 may have collided with one or more other vehicles or the vehicle may have rolled off the road and one or more vehicle occupants may be severely injured or unconscious, thereby unable to respond to a bystander exterior to the vehicle 200. Before emergency response professionals (e.g., paramedics, firefighters, etc.) arrive at the location of the vehicle 200, it may be desirable to enable communication between an emergency response dispatcher operating a remote device 180 and the by-stander exterior to the vehicle 200 via existing communication system components in a vehicle.

Accordingly, it may be desirable to enable the vehicle communication system for conveying audible communication between the vehicle interior and the vehicle exterior in scenarios where the vehicle occupant(s) may be injured or unconscious. Such improved communication systems and method of operating communication systems have now been devised.

Figure 3:
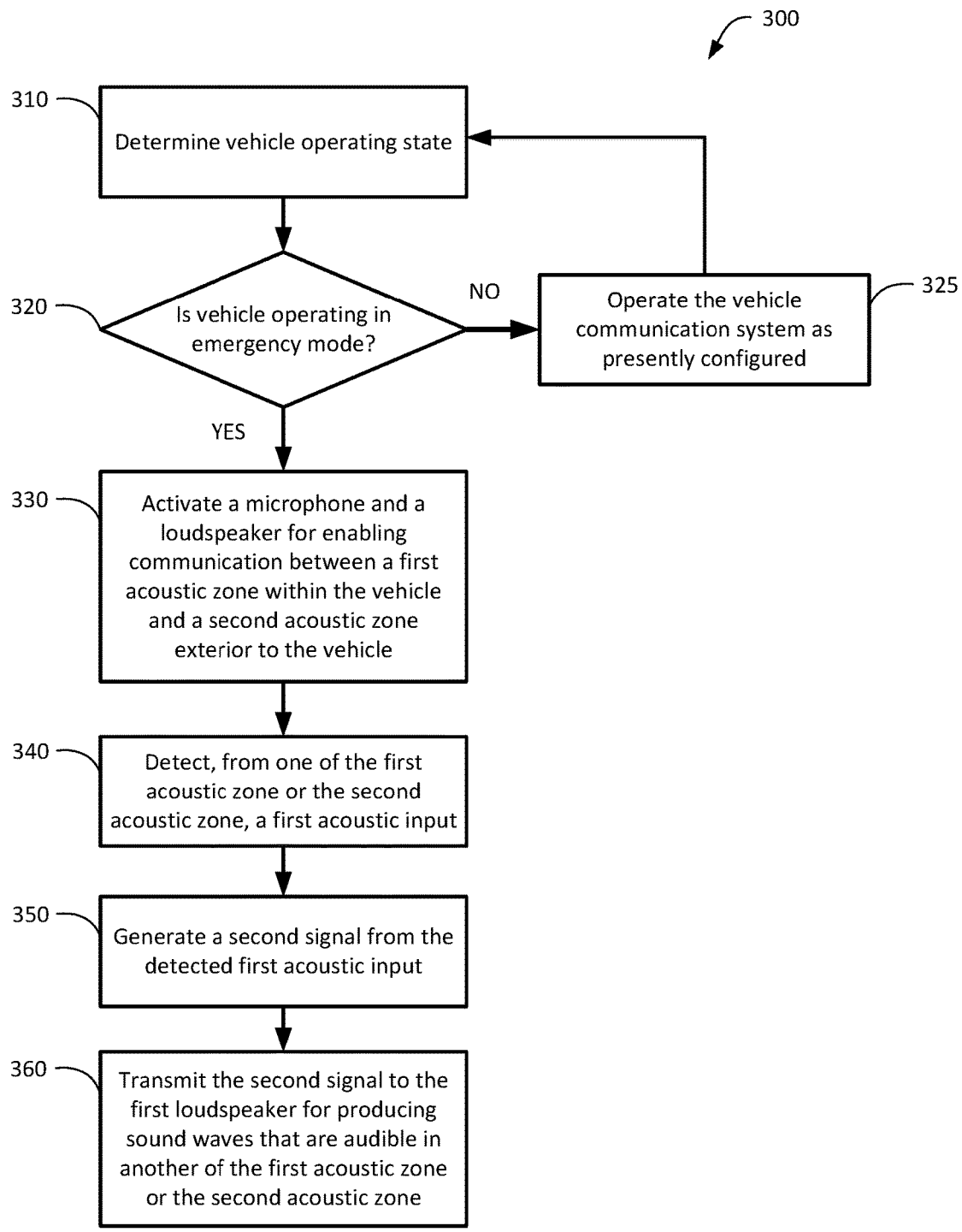
FIG. 3 illustrates, in flowchart form, a method of operating a vehicle communication system, in accordance with an example of the present application.

Reference is now made to FIG. 3, which illustrates, in flowchart form, a method 300 of operating a vehicle communication system 110 (FIG. 1) in a vehicle, in accordance with an example of the present application. The method 300 includes operations that are carried out by one or more processors of the vehicle communication system 110. The method 300 may be implemented, at least in part, through processor-executable instructions associated with the aural manager 112 (FIG. 1). In some examples, one or more of the operations may be implemented via processor-executable instructions in other applications or in an operating system stored and executed in memory of the vehicle communication system 110. As described, the vehicle communication system 110 includes one or more microphones 130 (FIG. 1) and one or more loudspeakers 120 (FIG. 1).

At operation 310, the processor determines the vehicle operating state. In some examples, the vehicle may be operating in a normal vehicle operation mode, such as when the vehicle is operating to transport a vehicle passenger from a first location to a second location. In some scenarios, the vehicle is associated with an emergency operating state when the vehicle has veered off the road and has rolled over or when the vehicle has collided with other vehicles or objects. In some scenarios, the vehicle is associated with a service operating state when the vehicle is at a vehicle maintenance garage for diagnosis and repair. The aforementioned vehicle operating states are examples and other vehicle operating states can be contemplated.

At operation 320, the processor determines whether the vehicle is operating in an emergency operating state. For example, the processor is configured to determine that the vehicle is in an emergency mode based on one or more sensors positioned about the vehicle. Sensors such as accelerometers, gyroscopes, impact sensors, airbag sensors, thermal sensors, or other type of sensors can detect sudden deceleration, impact force above a predefined threshold, abnormal vehicle movement (e.g., roll-over), or sudden changes in temperature that can be indicative of a vehicle emergency. Thus, in some examples, processor is configured to determine that the vehicle may be operating in the emergency mode upon detection of the aforementioned example sensor conditions.

In some examples, the processor is configured to determine that the vehicle is operating in the emergency mode in response to detecting, from one or more microphones positioned about the vehicle, a predefined acoustic input. For example, the predefined acoustic input may include voice activation code words, such as "Enable emergency communication system", "call 911" or "I need help". That is, the processor determines that the vehicle may be operating in the emergency mode based on predefined voice-activated commands.

In some examples, the processor detects the predefined acoustic input from within the first acoustic zone 250 (FIG. 2A) within the vehicle. In the case that the vehicle may have veered off a road and rolled over into a roadside ditch, a vehicle occupant may be injured but conscious. The vehicle occupant can enable the emergency mode for enabling communication between the first acoustic zone 250 within the vehicle and the second acoustic zone 260 (FIG. 2) external to the vehicle.

In some examples, the processor detects the predefined acoustic input from the second acoustic zone 260 (FIG. 2B) external to the vehicle. That is, in the case that the vehicle may have veered off the road and rolled over into a roadside ditch causing the vehicle occupant to be unconscious, a bystander witnessing the vehicle roll-over may enable the emergency mode for enabling communication between the first acoustic zone 250 and the second acoustic zone 260. In some examples, the processor is configured to determine the vehicle is operating in the emergency mode upon detecting expressions such as "Hello, can you hear me?" or upon detecting vibrations from a bystander banging on the exterior of the vehicle. The bystander being able to enable the emergency mode may be desirable when the bystander may not be equipped to access the vehicle (e.g., breaking down a vehicle window or extricating a vehicle door) but may find it useful to attempt communication with the vehicle occupant (e.g., reassuring the vehicle occupant) prior to emergency responder professionals arriving at the vehicle.

When the processor determines that the vehicle is not operating in an emergency operating state, at operation 325, the processor is configured to refrain from making changes to configuration of the loudspeakers 120 or the microphones 130. That is, in some examples, when the processor determines that the vehicle is not operating in an emergency operating state, the processor operates the vehicle communication system as presently configured. For example, the vehicle communication system 110 conducts operations for providing hands-free communication, active noise control, or other enhancements to in-vehicle communications.

When the processor determines that the vehicle is operating in an emergency operating state, at operation 330, the processor activates a first microphone 230a (FIG. 2A) and a first loudspeaker 220a (FIG. 2A) for enabling communication between a first acoustic zone 250 (FIG. 2A) within the vehicle and a second acoustic zone 260 (FIG. 2A) exterior to the vehicle.

In some scenarios, the vehicle includes loudspeakers or microphones positioned about the first acoustic zone 250 within the vehicle. When the processor activates the first microphone 230a and the first loudspeaker 220a for enabling communication between the first acoustic zone 250 within the vehicle and a second acoustic zone 260 exterior to the vehicle, the processor executes operations to amplify or otherwise process signals transmitted to the first loudspeaker. In the foregoing example, at operation 330, the processor activates the first microphone 230a and the first loudspeaker 220a; however, the processor can activate two or more microphones or loudspeakers for detecting acoustic input from any occupant of the vehicle.

In some other scenarios, the vehicle includes one or more loudspeakers or one or more microphones positioned external to the vehicle for enabling communication between the first acoustic zone 250 within the vehicle and the second acoustic zone 260 exterior to the vehicle. Because it may be undesirable for occupant conversations to be amplified and broadcast to areas external to the vehicle, the externally positioned loudspeakers and microphones are enabled only in response to the vehicle entering an emergency mode.

At operation 340, the processor detects, from the first acoustic zone 250, a first acoustic input using the first microphone 230a. In some other examples, the processor can detect the first acoustic input using any other microphone (such as the second microphone 230b, the third microphone 230c, the fourth microphone 240c) that was subsequently activated by the processor. When the vehicle is operating in the emergency mode, it may be desirable to detect acoustic input from any of the vehicle occupants. That is, in the scenario that the vehicle may have veered off the road and rolled over, it may be desirable to detect acoustic input from any of the vehicle occupants. Limiting acoustic input detection to the acoustic input from a driver, for example, may be undesirable in the case that the driver sustains serious injuries or is unable to audibly communicate.

In contrast, when the vehicle is not operating in the emergency operating state, the processor is configured to detect acoustic input under predefined conditions or in a particular configuration, such as for noise cancellation or for targeting aural enhancement for in-car communication. Accordingly, in some emergency scenarios, at operation 340, in the interest of accommodating any one of the vehicle occupants, the processor is configured to detect the first acoustic input from any of the microphones.

In some examples, the first acoustic input detected from the first acoustic zone (e.g., acoustic zone within the vehicle) may include audible speech from one of the vehicle occupants who is calling for assistance. In some examples, the first acoustic input may include other acoustic input useful to a bystander external to the vehicle for triaging the disabled vehicle. In some scenarios, the acoustic input includes high-pitched noises suggestive of one or more pipes leaking a gaseous or liquid fluid that may be hazardous to the vehicle occupants and it may be desirable to convey the acoustic input to the second acoustic zone 260 external to the vehicle.

In some examples, the first acoustic zone includes a combination of sub-zones. For example, as illustrated in FIG. 2B, the vehicle 200 is configured to include a first inner acoustic zone 252 and a second inner acoustic zone 254. The first inner acoustic zone 252 includes a volume of space for the driver 280 (e.g., vehicle operator occupant) and the front passenger 282. The second inner acoustic zone 254 includes a volume of space for other passengers. As described herein, microphones are positioned in respective acoustic zones for detecting audible speech or other sounds substantially originating from the respective acoustic zones.

The first acoustic zone within the vehicle can be configured in other ways. In some scenarios, the first acoustic zone includes a primary inner acoustic zone associated with a vehicle operator occupant (e.g. driver). The primary inner acoustic zone includes a primary microphone directed to detection of audible speech substantially originating from the vehicle operator occupant. A secondary inner acoustic zone is associated with one or more non-operator occupants, such as a passenger in the front portion of the vehicle and/or in rear portions of the vehicle. In the present example, at operation 340, the processor detects from the primary inner acoustic zone a first acoustic input. However, detection of acoustic input need not be limited to the primary acoustic zone. For example, in the event that the vehicle has been involved in a collision, the vehicle operator occupant may be injured/non-responsive and a non-vehicle operator (e.g., passenger) may not be injured and may be responsive. Thus, in an alternative scenario, at operation 340, the processor detects from the secondary inner acoustic zone a first acoustic input. Accordingly, at operation 340, the processor detects acoustic input from a vehicle occupant who is not the vehicle operator (e.g., vehicle driver).

At operation 350, the processor generates a second signal from the detected first acoustic input. For example, the processor receives an electrical signal from the first microphone that corresponds to the detected first acoustic input and, subsequently, amplifies the electrical signal to generate the second signal. In some scenarios, the processor executes operations to amplify the signal such that the second signal may be transmitted to a loudspeaker for producing sound waves that can be audible in the second acoustic zone exterior to the vehicle.

At operation 360, the processor transmits the second signal to one or more of the loudspeakers and the one or more loudspeakers may produce sound waves that are audible in the second acoustic zone exterior to the vehicle. It can be appreciated that when the vehicle is operating in an emergency mode, the operations of method 300 enable communication between the first acoustic zone and the second acoustic zone, which may be contrary to what may be desirable when the vehicle is operating in a normal vehicle operation mode. When the vehicle is operating in a normal vehicle operation mode, the processor conducts active noise control operations. As described, active noise control operations minimize aural sound waves that originate from the second acoustic zone exterior to the vehicle. Similarly, when the vehicle is operating in a normal vehicle operation mode, the processor conducts in-vehicle communication operations for enhancing detected audible speech from vehicle occupants, while minimizing or cancelling out aural input originating from the second acoustic zone.

In the foregoing description, at operation 340, the processor detects the first acoustic input from the first acoustic zone 250. However, at operation 340, the processor can alternatively detect the first acoustic input from the second acoustic zone 260. For instance, when the vehicle 200 may have veered off a road and rolled over, the vehicle occupants may initially be unresponsive. A bystander external to the vehicle who may have witnessed the vehicle 200 veering off the road may initially approach the vehicle 200 and call out to the vehicle occupants (e.g., first acoustic input) to inquire whether the vehicle occupants are injured or to what degree the vehicle occupants have been injured.

Thus, at operation 340, once the processor detects, from the second acoustic zone external to the vehicle, the first acoustic input, at operation 350, the processor generates the second signal from the first acoustic input. For example, the processor receives an electrical signal from the first microphone that corresponds to the detected first acoustic input and, subsequently amplifies the electrical signal to generate the second signal. In some scenarios, the processor executes operations to amplify the signal such that the second signal may be transmitted to a loudspeaker for producing sound waves that may be audible in the first acoustic zone within the vehicle.

In the foregoing alternative scenario, at operation 360, the processor transmits the second signal to one or more of the loudspeakers and the one or more loudspeakers produces sound waves that are be audible in the first acoustic zone within the vehicle. Thus, when the vehicle is operating in the emergency mode, operations of the method 300 enable communication between the second acoustic zone external to the vehicle and the first acoustic zone. It can be appreciated that active noise control or in-vehicle communication operations limit conveyance of acoustic input from the second acoustic zone to the first acoustic zone. Thus, in response to determining that the vehicle is operating in the emergency mode, the processor disables at least one of noise cancellation or active noise control operations of the vehicle communication system.

In the foregoing examples of when the vehicle may be in an emergency operating mode, the vehicle conveys acoustic input originating from the first acoustic zone 250 to the second acoustic zone 260 via the one or more loudspeakers and the one or more microphones, or vice versa.

In some scenarios, a vehicle in an emergency mode can be hazardous to approach. When the vehicle is on fire or when the vehicle is rolled over in a muddy sink hole on a side of the road, it can be hazardous for a bystander to approach or remain beside the vehicle to assist the vehicle occupants. Because the bystander cannot safely approach the vehicle, it could be difficult to detect acoustic input from the bystander via the microphones mounted at the vehicle. It could also be difficult to produce sound waves audible by the bystander who is distal from the vehicle. In the present example, at operation 330, in addition to activating a first microphone 230a and a first loudspeaker 220a, the processor detects a mobile device 184 (FIG. 1), associated with the bystander proximal to the vehicle communication system 110, that is within communication range and establishes a secondary communication link (e.g., Bluetooth™ link) with the mobile device 184 for conveying acoustic input originating from the first acoustic zone (e.g., within the vehicle) to the second acoustic zone (e.g., external to the vehicle), or vice versa. Thus, at operation 360, the processor also transmits the second signal generated from the first acoustic input to the mobile device 184 for producing sound waves using a mobile device loudspeaker that are audible by the bystander in the second acoustic zone. When in the emergency operating state and when it may be unsafe for the bystander to approach the vehicle, the aforementioned secondary communication link enables conveyance of audible communication between the vehicle interior and the vehicle exterior. The secondary communication link between the mobile device 184 and the vehicle communication system is a Bluetooth™ link, but any other suitable short-range communication link, or a communication link via the network 150 can be used. A Bluetooth link with the mobile device 184 of the bystander can be used to convey some information to vehicle or to the Public Safety Answering Point. For example, a telephone number associated with the mobile device 184 can be used to add the bystander to the ongoing call as a third party. In this way, if the bystander must leave the vicinity of the vehicle due to an unsafe condition, they can remain on the call to the Public Safety Answering Point, and the vehicle occupants, and relay information accordingly.

In some scenarios, when the vehicle 200 collides with another vehicle or rolls over, the vehicle occupants may not be responsive. In this scenario, it may be desirable for a bystander external to the vehicle to convey these observations to an emergency response dispatcher. Although the bystander could utilize his or her personal mobile telephonic device for communicating with the emergency response dispatcher, it may be desirable to enable such communication via the vehicle communication system 110 (FIG. 1) described herein. In some examples, enabling such communication via the vehicle communication system 110 is performed without any vehicle occupant or bystander explicitly enabling the vehicle communication system 110 in the emergency mode. That is, the processor can detect acoustic input indicative of an emergency mode or can detect sensor input indicative of an emergency mode.

Figure 4A:
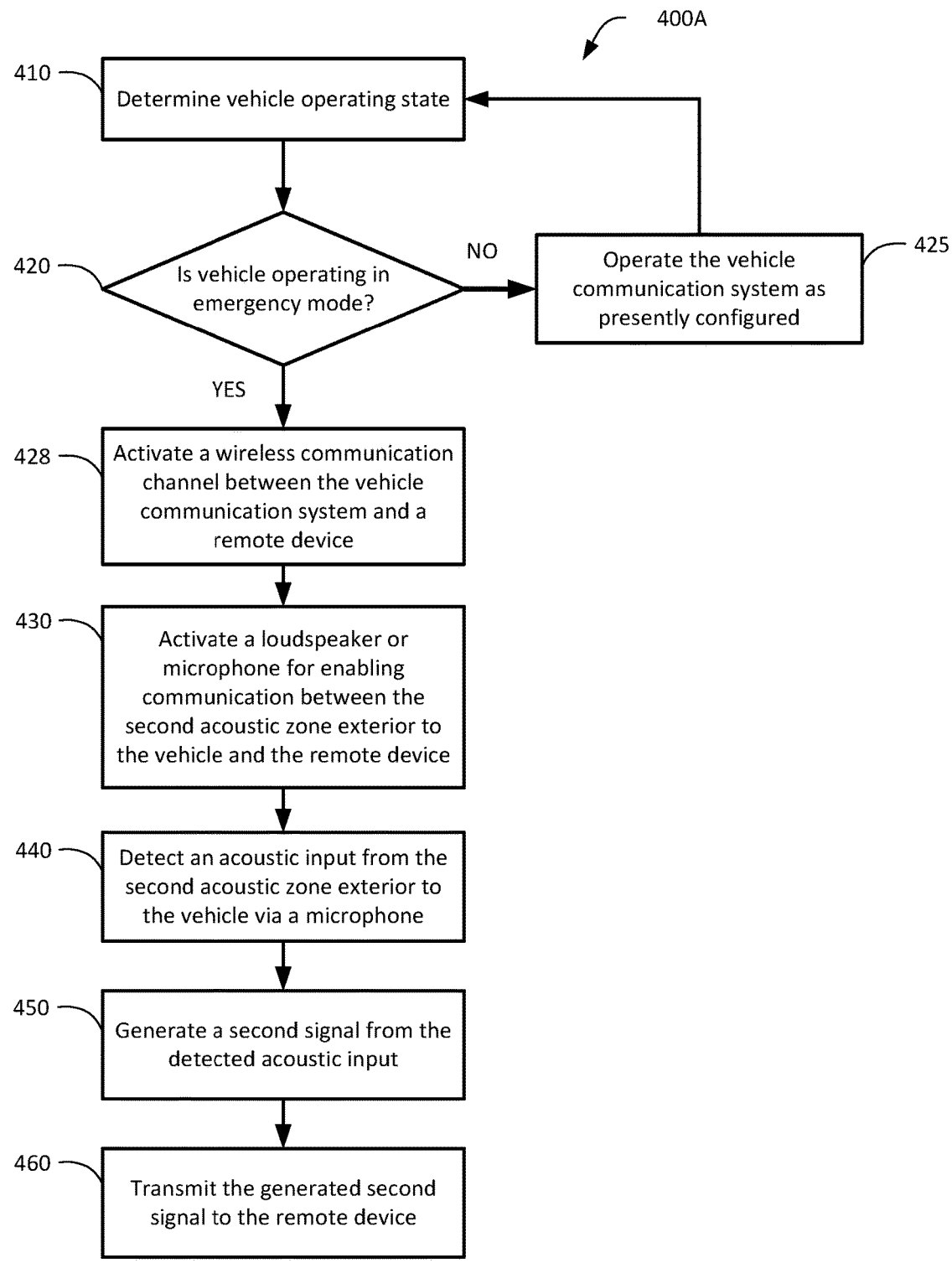
FIGS. 4A and 4B illustrate, in flowchart form, methods of operating a vehicle communication system, in accordance with an example of the present application.

Reference is now made to FIG. 4A, which illustrates, in flowchart form, a method 400A of operating a vehicle communication system 110 (FIG. 1), in accordance with an example of the present application. The method 400A includes operations carried out by one or more processors of the vehicle communication system 110 (FIG. 1). The method 400A may be implemented, at least in part, through processor-executable instructions associated with the aural manager 112 (FIG. 1). In some examples, one or more of the operations are implemented via processor-executable instructions in other applications or in an operating system stored and executed in memory of the vehicle communication system 110.

Operations 410, 420, and 425 may be similar to operations 310, 320, and 325 of the method 300 of FIG. 3. That is, at operation 410, the processor determines the vehicle operating state. At operation 420, the processor determines whether the vehicle is operating in an emergency operating state. When the processor determines that the vehicle is not operating in an emergency operating state, at operation 425, the processor may refrains from making changes to configuration of the loudspeakers 120 (FIG. 1) or the microphones 130 (FIG. 1). That is, at operation 425, the processor operates the vehicle communication system as presently configured.

When the processor determines that the vehicle is operating in an emergency operating state, at operation 428, the processor activates a wireless communication channel between the vehicle communication system 110 and the remote device 180 (FIG. 1). In some examples, the vehicle communication system 110 activates the wireless communication channel in response to input from one or more of the vehicle occupants. In some other examples, the vehicle communication system 110 automatically activates the wireless communication channel in response to detecting a vehicle collision or abnormal vehicle movement (e.g., roll over or the like). In some other examples, the input includes activating a push button switch for activating the wireless communication channel. In some other examples, the input includes voice activation of the wireless communication channel (e.g., audible speech detection for the phrase "please connect to 911").

Upon activating the wireless communication channel, at operation 430, processor activates one or more loudspeakers or one or more microphones for enabling communication between the second acoustic zone exterior to the vehicle and the remote device. For instance, at operation 430, the processor activates one or more loudspeakers or one or more microphones for enabling communications between: (1) the first acoustic zone 250 (FIG. 2A) and the second acoustic zone 260 (FIG. 2A); and/or (2) the second acoustic zone 260 (FIG. 2A) exterior to the vehicle and the remote device 180. Operations of the method 400 facilitate real-time or near real-time access to information from either. (a) the vehicle occupants; and/or (b) the bystander external to the vehicle.

At operation 440, the processor detects an acoustic input from the second acoustic zone 260 external to the vehicle via the one or more microphones 230.

At operation 450, the processor generates a signal from the detected acoustic input. That is, the vehicle computing device 110 receives an electrical signal from the one or more microphones that detected the acoustic input originating from the second acoustic zone 260 and, subsequently, amplifies the electrical signal to generate the second signal.

At operation 460, the processor transmits the second signal, via the network 150, to the remote device 180 and the remote device 180 subsequently produces acoustic output from the second signal on a loudspeaker of the remote device 180. It can be appreciated that when the vehicle occupants are not responsive, the emergency response dispatcher communicates with a bystander external to the vehicle for receiving real-time or near real-time information regarding the state of the vehicle occupants and the vehicle.

In some examples, at operation 430, the one or more activated microphones are positioned within the vehicle. When the microphones are positioned within the vehicle, the processor detects acoustic input from the second acoustic zone external to the vehicle in a similar way that the processor may detect undesirable background road or engine noise. In some other examples, at operation 430, the one or more activated microphones is a microphone that is positioned exterior to the vehicle.

As described in a previous example, in some scenarios, a vehicle in an emergency mode can be hazardous to approach. When the vehicle is on fire or when the vehicle is rolled over in a muddy sink hole on a side of the road, it can be hazardous for a bystander to approach the vehicle to assist the vehicle occupants. Further, when the vehicle is in the emergency operating mode, the vehicle occupants may be unresponsive. In the present example, at operation 428, in addition to activating a wireless communication channel between the vehicle communication system 110 and the remote device 180 (e.g., Public Safety Answering Point), the processor detects a mobile device 184 (FIG. 1), associated with the bystander proximal to the vehicle communication system 110, that is within communication range and establishes a secondary communication link with the mobile device 184 for conveying acoustic input originating from the remote device 180 to the mobile device 184, and vice versa. Thus, at operation 460, the processor also transmits the second signal generated from the first acoustic input to the mobile device 184. In the present example, when the processor detects the mobile device 184 within the communication range for establishing the secondary communication link with the mobile device 184, the mobile device 184 can activate an alert to the bystander associated with the mobile device 184 by way of a ringtone to alert the bystander that they may communicate with the vehicle occupants or with the remote device 180 (e.g., Public Safety Answering Point) via a microphone and loudspeaker of the mobile device 184.

In a further scenario, when the vehicle may be on fire or when the vehicle may be sinking into a sink hole, the vehicle communication system 110 can become damaged and cease to operate. In this further example, the processor conducts operations for establishing a communication link between the remote device 180 and the mobile device 184 such that emergency dispatch personnel at the Public Safety Answering Point may continue to communicate with the bystander associated with the mobile device 184. The processor can provide the remote device 180 with a communication link identifier of the mobile device 184 (e.g., telephone number or device identifier) such that the remote device 180 can establish, via the network 150, a communication link with the mobile device 184 for continuing a conversation and in spite of the vehicle communication system 110 becoming damaged or out of communication range. In some scenarios, it may be desirable to allow the emergency response dispatcher operating the remote device 180 to access the wireless communication channel on demand. To illustrate, reference is made to FIG. 4B, which illustrates a method 400B of operating the vehicle communication system 110 (FIG. 1), in accordance with another example of the present application. The method 400B includes operations that are carried out by one or more processors of the vehicle communication system 110 (FIG. 1). The method 400B may be implemented, at least in part, through processor-executable instructions associated with the aural manager 112 (FIG. 1). In some examples, one or more of the operations are implemented via processor-executable instructions in other applications or in an operating system stored and executed in memory of the vehicle communication system 110.

Figure 4B:
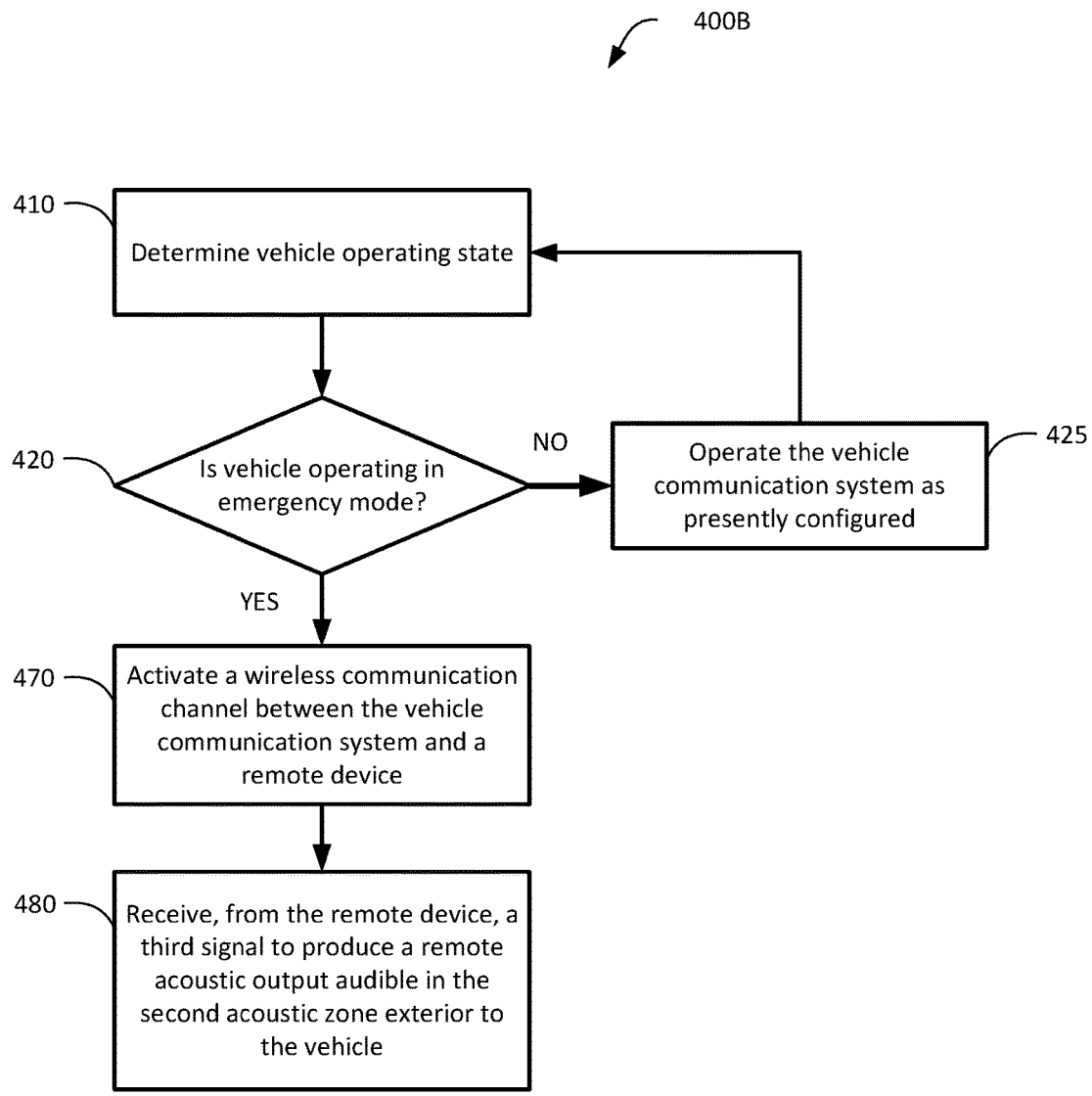

Operations 410, 420, and 425 in FIG. 4B may correspond to similarly numbered operations in FIG. 4A. That is, at operation 410, the processor determines the vehicle operating state. At operation 420, the processor determines whether the vehicle is operating in an emergency operating state. When the processor determines that the vehicle is not operating in an emergency operating state, at operation 425, the processor refrains from making changes to configuration of the loudspeakers 120 (FIG. 1) or the microphones 130 (FIG. 1). That is, at operation 524, the processor operates the vehicle communication system as presently configured.

When the processor determines that the vehicle is operating in an emergency operating state, at operation 470, the processor activates a wireless communication channel between a remote device 180 and the vehicle communication system 110. Similar to examples described herein, the remote device 180 can be a computing device operated by an emergency response dispatcher at a public safety answering point call center.

At operation 480, the processor receives, from the remote device 180 and at the one or more loudspeakers 220 (FIG. 2), a third signal to produce a remote acoustic output including sound waves that may be audible in the second acoustic zone 260 (FIG. 2) exterior to the vehicle 200. The remote acoustic output may include audible speech of the emergency response dispatcher operating the remote device 180. It can be appreciated that the wireless communication channel enables communication between: (1) the remote device 180 and vehicle occupants within the first acoustic zone; and/or (2) the remote device 180 and the second acoustic zone 260 (FIG. 2A) that may be exterior to the vehicle.

In the foregoing example, the wireless communication channel is useful to allow bystanders external to the vehicle currently in an emergency operating mode to communicate real-time or near real-time information to a remote device. Said communication channel can be particularly useful prior to appropriate emergency response professionals being dispatched and arriving at the vehicle location. That is, the wireless communication channel is useful during a window of time between: (a) when the vehicle begins operating in the emergency operating mode; and (b) when first responder professionals (e.g., firefighters, paramedics, or law enforcement professionals) arrive at the vehicle location. During said window of time, an emergency response dispatcher can proactively inquire via acoustic output to the second acoustic zone (external to the vehicle) whether any bystanders are present and, if so, inquire particular information for triaging the vehicle emergency.

When the vehicle 200 is in an emergency operating mode, the vehicle may be positioned such that a portion of the vehicle perimeter may be encumbered by an adjacent object. For example, the vehicle 200 may have rolled down into a ditch and the vehicle 200 may have landed on its side such that one side of the car may be within a roadside ditch. In such scenarios, when the vehicle is in the emergency operating mode, it may be desirable to provide acoustic output to a targeted acoustic zone.

As described in FIG. 2B, the vehicle communication system 110 may be configured to manage a plurality of loudspeakers and microphones positioned about the vehicle 200. Further, the vehicle communication system 110 may configure associations between: (1) subsets of loudspeakers or microphones; and (2) acoustic zones. For example, referring again to FIG. 2B, the first microphone 230a and the second microphone 230b are associated with the first inner acoustic zone 252, while the third microphone 230c and the fourth microphone 230d are associated with the second inner acoustic zone 254. Further, a subset of loudspeakers, such as the fifth loudspeaker 220e, the sixth loudspeaker 220f, the seventh loudspeaker 220g, or the eight loudspeaker 220h on the "right side" of the vehicle 200 as illustrated in FIG. 2B are associated with the first external acoustic zone 262, while the first loudspeaker 220a, the second loudspeaker 220b, the third loudspeaker 220c, or the fourth loudspeaker 220d on the "left side" of the vehicle 200 as illustrated in FIG. 2B are associated with the second external acoustic zone 264. Although four acoustic zones are associated with respective subsets of microphones and loudspeakers, any number of acoustic zones can associated with other subsets of microphones or loudspeakers. In some scenarios, it may be desirable to provide acoustic output to a targeted acoustic zone.

Figure 5:
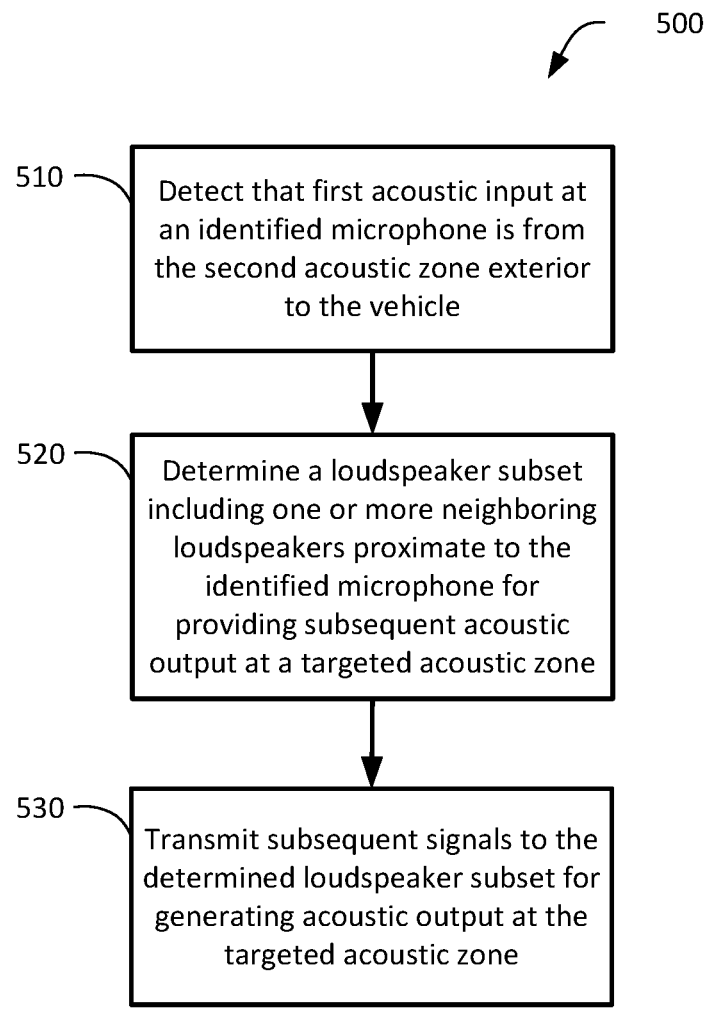
FIG. 5 illustrates, in flowchart form, a method of operating the vehicle communication system, in accordance with another example of the present application.

To illustrate operations for providing acoustic output to targeted acoustic zones, reference is made to FIG. 5, which illustrates, in flowchart form, a method 500 of operating the vehicle communication system 110 (FIG. 1) in a vehicle, in accordance with an example of the present application. The method 500 includes operations that are carried out by one or more processors of the vehicle communication system 110. The method 500 may be implemented, at least in part, through processor-executable instructions associated with the aural manager 112 (FIG. 1). In some examples, one or more of the operations are implemented via processor-executable instructions in other applications or in an operating system stored and executed in memory of the vehicle communication system 110. Operations of the method 500 are carried out by a processor of the vehicle communication system 110 that includes a plurality of microphones and loudspeakers positioned about the vehicle.

At operation 510, the processor detects that the first acoustic input received at an identified microphone is from the second acoustic zone. The second acoustic zone may be exterior to the vehicle. For example, referring again to FIG. 2B, the processor detects at the second microphone 230b the acoustic input from the second acoustic zone. In particular, the processor determines that the acoustic input originated from the first external acoustic zone 262 illustrated in FIG. 2B. The operations for detecting that the first acoustic input is received from the second acoustic zone exterior to the vehicle may be similar to vehicle communication system operations that may distinguish road/engine noise from acoustic input originating from a vehicle occupant.

At operation 520, the processor determines a loudspeaker subset including one or more neighboring loudspeakers proximate to the identified microphone (e.g., the second microphone 230b). The processor determines that the loudspeaker subset includes the subset of loudspeakers including the fifth loudspeaker 220e, the sixth loudspeaker 220f, the seventh loudspeaker 220g, or the eighth loudspeaker 220h on the "right side" of the vehicle 200 as illustrated in FIG. 2B. In the foregoing example, the processor identifies the subset of loudspeakers on the "right side" of the vehicle based on their close proximity to the second microphone 230b. The determined loudspeaker subset are configured for providing subsequent acoustic output at a targeted acoustic zone. In particular, the subset of loudspeakers on the "right side" of the vehicle may be identified as loudspeakers proximal to the targeted acoustic zone.

At operation 530, the processor transmits subsequent signals to the determined loudspeaker subset for generating subsequent acoustic output such that the acoustic output are audible at the targeted acoustic zone. It can be appreciated that by determining a loudspeaker subset proximal to a microphone that receives acoustic input from an acoustic zone exterior to the vehicle, the processor provides subsequent acoustic output to a targeted acoustic region exterior to the vehicle.

The subject matter of the disclosure herein may also relate, among others, to the embodiments of the following clauses:

AA. A method of operating a communication system (110) in a vehicle (200), the communication system (110) including one or more microphones (230a-230d) and one or more loudspeakers (220a to 220h), the method comprising: determining that the vehicle (200) is operating in an emergency mode and, in response, activating a first microphone (230a) and a first loudspeaker (230a) for enabling communication between a first acoustic zone (250) within the vehicle and a second acoustic zone (260) exterior to the vehicle; detecting, from one of the first acoustic zone (250) and the second acoustic zone (260), a first acoustic input using the first microphone (230a); generating a second signal from the detected first acoustic input; and transmitting the second signal to the first loudspeaker (220a) for producing sound waves that are audible in the other of the first acoustic zone (250) and the second acoustic zone (260).

BB. The method of clause AA, further comprising: in response to determining that the vehicle (200) is operating in the emergency mode, activating a wireless communication channel between a remote device (180) and the communication system (110); and receiving, from the remote device (180) and at the first loudspeaker (220a), a third signal to produce a third acoustic output including sound waves that are audible in the second acoustic zone (260) exterior to the vehicle (200), wherein the third acoustic output includes audible speech.

CC. The method of clause AA or clause BB, wherein the first acoustic input is detected by the first microphone (230a) from the second acoustic zone (260) exterior to the vehicle (200), and the method further comprising: in response to determining that the vehicle (200) is operating in the emergency mode, activating a wireless communication channel between a remote device (180) and the communication system (110); and transmitting, to the remote device (180), the second signal generated from the first acoustic input.

DD. The method of clause CC, wherein the first microphone (230a) is positioned within the vehicle.

EE. The method of any one of clauses AA to DD, further comprising: in response to determining that the vehicle (200) is operating in the emergency mode, detecting a mobile device (184) proximal to the vehicle communication system (110) and, in response to detecting the mobile device (184), establishing a secondary communication channel with the mobile device (184); and transmitting, to the mobile device (184), the second signal generated from the first acoustic input.

FF. The method of any one of clauses AA to EE, wherein the communication system (110) includes a plurality of microphones (230a-230d) and a plurality of loudspeakers (220a-220h) positioned about the vehicle (200), the method further comprising: detecting that the first acoustic input at an identified microphone is from the second acoustic zone (260) exterior to the vehicle and, in response, determining a loudspeaker subset including one or more neighboring loudspeakers proximate to the identified microphone for providing subsequent acoustic output at a targeted acoustic zone; and transmitting subsequent signals to the determined loudspeaker subset for generating subsequent acoustic output at that targeted acoustic zone.

GG. The method of any one of clauses AA to FF, wherein determining that the vehicle (200) is operating in the emergency mode includes detecting, at the one or more microphones (230a-230d), a predefined acoustic input from one of the first acoustic zone or the second acoustic zone.

HH. The method of clause GG, wherein the predefined acoustic input is one of a plurality of voice activation code words.

II. The method of any one of clauses AA to HH, wherein at least one of the one or more microphones (230a-230d) or the one or more loudspeakers (220a-220h) are positioned exterior to the vehicle (200).

JJ. The method of any one of clauses AA to II, wherein the first acoustic zone (250) includes a primary inner acoustic zone (252) associated with a vehicle operator occupant and a secondary inner acoustic zone (254) associated with a non-operator occupant, and wherein the detected first acoustic input is detected from the secondary inner acoustic zone (254) associated with the non-operator occupant.

KK. A communication system in a vehicle comprising: a processor (602); a memory (604) coupled to the processor (602); a first loudspeaker (220a) and a first microphone (230a) coupled to the processor (602); and an aural manager (112) including processor executable instructions stored in the memory (604) that, when executed, cause the processor to (602): determine that the vehicle (200) is operating in an emergency mode and, in response, activating the first microphone (230a) and the first loudspeaker (220a) for enabling communication between a first acoustic zone (250) within the vehicle (200) and a second acoustic zone (260) exterior to the vehicle (200); detect, from one of the first acoustic zone (250) and the second acoustic zone (260), a first acoustic input using the first microphone (230a); generate a second signal from the detected first acoustic input; and transmit the second signal to the first loudspeaker (220a) for producing sound waves that are audible the other of the first acoustic zone (250) and the second acoustic zone (260).

LL. The communication system of clause KK, wherein the processor executable instructions, when executed, further cause the processor (602) to: in response to determining that the vehicle (200) is operating in the emergency mode, activate a wireless communication channel between a remote device (180) and the communication system (110); and receive, from the remote device (180) and at the first loudspeaker (220a), a third signal to produce a third acoustic output including sound waves that are audible in the second acoustic zone (260) exterior to the vehicle, wherein the third acoustic output includes audible speech.

MM. The communication system of clause LL, wherein the remote device (180) is a public safety answering point call center.

NN. The communication system of any one of clauses KK to MM, wherein the first acoustic input is detected by the first microphone (230a) from the second acoustic zone (260) exterior to the vehicle, and wherein the processor executable instructions, when executed, further cause the processor (602) to: in response to determining that the vehicle (200) is operating in the emergency mode, activate a wireless communication channel between a remote device (180) and the communication system (110); and transmit, to the remote device (180), the second signal generated from the first acoustic input.

OO. The communication system of any one of clauses KK to NN, wherein the processor executable instructions, when executed, further cause the processor (602) to: in response to determining that the vehicle (200) is operating in the emergency mode, disable at least one of noise cancellation or active noise control operations at the communication system (110).

PP. The communication system of any one of clauses KK to OO, wherein the communication system (110) includes a plurality of microphones (230a-230d) and a plurality of loudspeakers (220a-220h) positioned about the vehicle (200), and wherein the processor executable instructions, when executed, further cause the processor (602) to: detect that the first acoustic input at an identified microphone is from the second acoustic zone (260) exterior to the vehicle (200) and, in response, determining a loudspeaker subset including one or more neighboring loudspeakers proximate to the identified microphone for providing subsequent acoustic output at a targeted acoustic zone; and transmit subsequent signals to the determined loudspeaker subset for generating subsequent acoustic output at that targeted acoustic zone.

QQ. The communication system of any one of clauses KK to PP, wherein determining that the vehicle (200) is operating in the emergency mode includes detecting, at one or more microphones (230a-220d), a predefined acoustic input from one of the first acoustic zone (250) or the second acoustic zone (260).

RR. The communication system of clause QQ, wherein the predefined acoustic input is one of a plurality of voice activation code words.

SS. The communication system of any one of clauses KK to RR, wherein at least one of the first loudspeaker (220a) and the first microphone (230a) is positioned external to the vehicle (200).

TT. A non-transitory computer-readable storage medium storing processor readable instructions for operating a vehicle communication system (110), the vehicle communication system (110) including one or more microphones (230a-230d) and one or more loudspeakers (220a-220h), wherein the instructions, when executed by a processor (602) of the vehicle communication system (110), cause vehicle communication system (110) to: determine that the vehicle (200) is operating in an emergency mode and, in response, activating a first microphone (230a) and a first loudspeaker (220a) for enabling communication between a first acoustic zone (250) within the vehicle and a second acoustic zone (260) exterior to the vehicle (200); detect, from one of the first acoustic zone (250) and the second acoustic zone (260), a first acoustic input using the first microphone (230a); generate a second signal from the detected first acoustic input; and transmit the second signal to the first loudspeaker for producing sound waves that are audible the other of the first acoustic zone (250) and the second acoustic zone (260).

Figure 6:
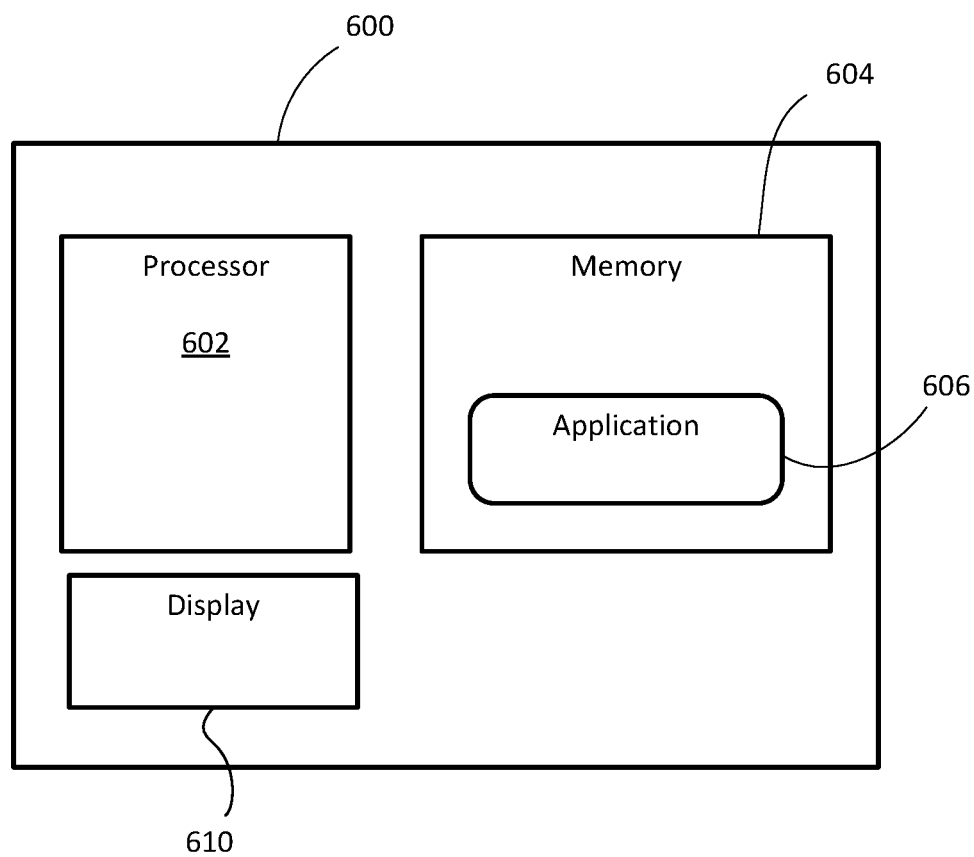
FIG. 6 illustrates a simplified block diagram of a vehicle communication system, in accordance with an example of the present application.

Reference is now made to FIG. 6, which illustrates, in simplified block diagram form, a vehicle communication system 600, in accordance with an example of the present application. The vehicle communication system 600 includes one or more processors 602 and memory 604. The memory 604 stores processor-executable software, such as an aural manager application 606, that contains instructions implementing the operations and functions of the vehicle communication system 600 described herein. The vehicle communication system 600 also includes a display interface 610 or a display for providing visual output to a vehicle occupant. Further, the vehicle communication system 600 includes one or more loudspeakers or one or more microphones (not illustrated), similar to the vehicle communication system 110 of FIG. 1.

Figure 7:
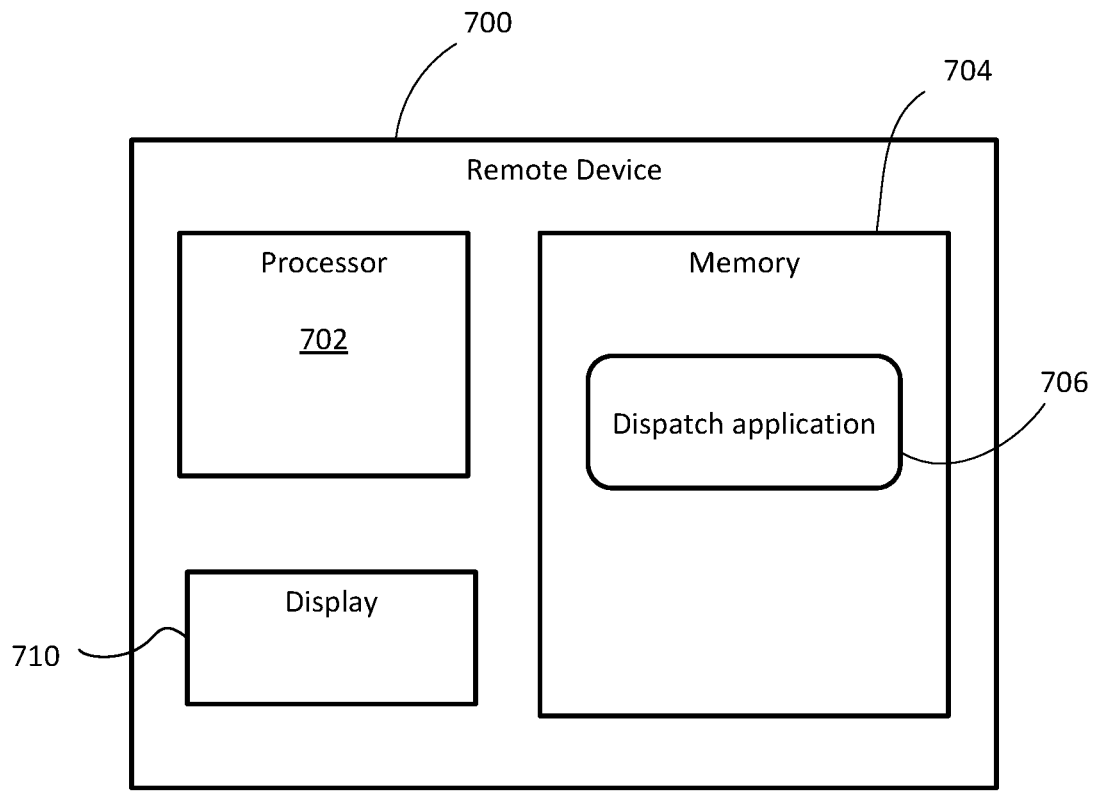
FIG. 7 illustrates in simplified block diagram form a remote device, in accordance with an example of the present application.

Reference is now made to FIG. 7, which illustrates, in simplified block diagram form, a remote device 700, in accordance with an example of the present application. The remote device 700 includes a display 710. In some examples, the remote device 700 is a portable electronic device, such as a smartphone device. In some other examples, the remote device 700 is a personal computer, a laptop computer, a tablet computer, a wearable computing device, or other type of computing device that is configured to store data and software instructions, and execute software instructions to perform operations consistent with the examples described herein.

The remote device 700 may be associated with one or more users, such as emergency response dispatchers at a public safety answering point call center described herein. The users can operate the remote device 700 by way of a graphical user interface. The display 710 may be any suitable manner of display, such as a liquid crystal display (LCD), an e-ink/e-paper display, or the like.

The remote device 700 includes a processor 702 and memory 704. The memory 704 stores processor-executable instructions in the form of software. The software may include an operating system to provide basic device functions, and may include application software. In some examples, the memory 704 stores a dispatch application 706 that, when executed, performs the dispatch application operations and other operations or functions described herein.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of operating a communication system in a vehicle, the communication system including one or more microphones and one or more loudspeakers, the communication system enabling active noise control operations when operating in a normal mode for minimizing audible sound waves in an interior acoustic zone that originate from an exterior acoustic zone, the interior acoustic zone being within the vehicle and the exterior acoustic zone being exterior to the vehicle, the method comprising:
   determining that the vehicle is operating in an emergency mode and in response:
      disabling the active noise control operations and activating a first microphone and a first loudspeaker for enabling communication between the interior acoustic zone and the exterior acoustic zone; and
      activating a wireless communication channel between a remote device and the communication system;
   detecting a first acoustic input using the one or more microphones;
   determining that the detected first acoustic input originates from the exterior acoustic zone and not the interior acoustic zone; and
   establishing an audio communications link between the exterior acoustic zone and the remote device via the communication channel, whereby the audio communications link enables voice communications between a bystander and the remote device operated by a public safety answering point.

2. The method of claim 1, further comprising:
   in response to determining that the vehicle is operating in the emergency mode, detecting a mobile device proximal to the vehicle communication system and, in response to detecting the mobile device, establishing a secondary communication channel with the mobile device for communications with the remote device.

3. The method of claim 1, wherein the communication system includes a plurality of microphones and a plurality of loudspeakers positioned about the vehicle, the method further comprising:
   determining a loudspeaker subset including one or more neighboring loudspeakers proximate to the one or more microphones that detect the first acoustic input for providing subsequent acoustic output at a targeted exterior acoustic zone; and
   transmitting subsequent signals to the determined loudspeaker subset for generating subsequent acoustic output at that targeted exterior acoustic zone.

4. The method of claim 1, wherein determining that the vehicle is operating in the emergency mode includes detecting a collision.

5. The method of claim 1, wherein determining that the vehicle is operating in the emergency mode includes detecting a vehicle roll-over.

6. The method of claim 1, wherein at least one of the one or more microphones or the one or more loudspeakers are positioned exterior to the vehicle.

7. A communication system in a vehicle comprising:
   a processor;
   a memory coupled to the processor;
   a first loudspeaker and a first microphone coupled to the processor; and
   an aural manager including processor executable instructions stored in the memory, the processor executable instructions enabling active noise control operations when operating in a normal mode for minimizing audible sound waves in an interior acoustic zone that originate from an external acoustic zone, the interior acoustic zone being within the vehicle and the exterior acoustic zone being exterior to the vehicle, the processor executable instructions, when executed, cause the processor to:
   determine that the vehicle is operating in an emergency mode and in response:
      disable the active noise control operations and activate the first microphone and the first loudspeaker for enabling communication between the interior acoustic zone and the exterior acoustic zone; and
      activate a wireless communication channel between a remote device and the communication system;
   detect a first acoustic input using the first microphone;
   determine that the detected first acoustic input originates from the exterior acoustic zone and not the interior acoustic zone; and
   establish an audio communications link between the exterior acoustic zone and the remote device via the communication channel, whereby the audio communications link enables voice communications between a bystander and the remote device operated by a public safety answering point.

8. The communication system of claim 7, wherein the remote device is a public safety answering point call center.

9. The communication system of claim 7, wherein the communication system includes a plurality of microphones and a plurality of loudspeakers positioned about the vehicle, and wherein the processor executable instructions, when executed, further cause the processor to:
   determine a loudspeaker subset including one or more neighboring loudspeakers proximate to the first microphone that detected the first acoustic input for providing subsequent acoustic output at a targeted exterior acoustic zone; and
   transmit subsequent signals to the determined loudspeaker subset for generating subsequent acoustic output at that targeted exterior acoustic zone.

10. The communication system of claim 7, wherein determining that the vehicle is operating in the emergency mode includes detecting a collision.

11. The communication system of claim 7, wherein determining that the vehicle is operating in the emergency mode includes detecting a vehicle roll-over.

12. The communication system of claim 7, wherein at least one of the first loudspeaker and the first microphone is positioned external to the vehicle.

13. A non-transitory computer-readable storage medium storing processor readable instructions for operating a vehicle communication system, the vehicle communication system including one or more microphones and one or more loudspeakers, the communication system enabling active noise control operations when operating in a normal mode for minimizing audible sound waves in an interior acoustic zone that originate from an exterior acoustic zone, the interior acoustic zone being within the vehicle and the exterior acoustic zone being exterior to the vehicle, and wherein the instructions, when executed by a processor of the vehicle communication system, cause vehicle communication system to:

determine that the vehicle is operating in an emergency mode and in response:

disable the active noise control operations and activate a first microphone and a first loudspeaker for enabling communication between the interior acoustic zone and the exterior acoustic zone; and activate a wireless communication channel between a remote device and the communication system;

detect a first acoustic input using the first microphone;

determine that the detected first acoustic input originates from the exterior acoustic zone and not the interior acoustic zone; and establish an audio communications link between the exterior acoustic zone and the remote device via the communication channel, whereby the audio communications link enables voice communications between a bystander and the remote device operated by a public safety answering point.

* * * * *